United States Patent [19]

Licchelli et al.

[11] Patent Number: 4,829,130
[45] Date of Patent: May 9, 1989

[54] SILYLATED DERIVATIVES OF ISOBUTENE CROSSLINKABLE UNDER AMBIENT CONDITIONS, AND PROCESS FOR PREPARING THEM

[75] Inventors: Maurizio Licchelli, Pavia; Alberto Greco, Dresano; Gabriele Lugli, San Donato Milanese, all of Italy

[73] Assignee: Enichem Sintesi S.p.A., Palermo, Italy

[21] Appl. No.: 75,043

[22] Filed: Jul. 17, 1987

[30] Foreign Application Priority Data

Jul. 23, 1986 [IT] Italy ................................ 21232 A/86

[51] Int. Cl.⁴ .............................................. C08F 8/00
[52] U.S. Cl. .................................. 525/384; 525/326.5; 526/279
[58] Field of Search ............................... 526/237, 238; 525/326.5, 384

[56] References Cited

U.S. PATENT DOCUMENTS 2,956,044 10/1960 Merker ................................ 526/279
3,418,293 12/1968 Bolchert .............................. 526/279

*Primary Examiner*—Christopher Henderson
*Attorney, Agent, or Firm*—Hedman, Gibson, Costigan & Hoare

[57] ABSTRACT

Isobutene is copolymerized with an unsaturated comonomer containing the chlorosilanic function, and the chlorosilanic function is subsequently transformed into an alkoxysilanic function by means of a reaction of alcoholysis, thus silylated copolymers of isobutene being obtained, which are crosslinkable under ambient conditions, suitable for use in sealants and paints.

12 Claims, No Drawings

SILYLATED DERIVATIVES OF ISOBUTENE CROSSLINKABLE UNDER AMBIENT CONDITIONS, AND PROCESS FOR PREPARING THEM

FIELD OF THE INVENTION

The present invention relates to a process for preparing silylated copolymers of isobutene, crosslinkable under ambient conditions of humidity and temperature, suitable for use in sealants and paints, as well as to said copolymers.

BACKGROUND OF THE INVENTION

In the art, elastomeric compositions are known, which contain polymers functionalized with reactive groups, which are fluids under ambient conditions, and are capable of crosslinking, due to the effect of atmosphere humidity, into solid and rubbery products, endowed with characteristics which make them useful in sealant compositions.

U.K. Pat. No. 1,167,521 discloses a process for transforming polymers of hydrocarbon type, e.g., copolymers of isobutene with piperylene, into polymers crosslinking under the influence of the ambient humidity, by means of the grafting of a chlorosilane in the presence of catalysts.

The disadvantage of the process consists in the severe grafting conditions: in fact, excess amounts of chlorosilane and free-radical catalysis are used, in as much as the milder catalysts based on platinum have resulted inefficacious.

In Polymer Sci. Polymer Chem., 18th Ed., 1529 (1980) and Polym. Bull. 1 575, (1979), Kennedy describes the preparation of α,ω-chlorosilane-derivatives of polyisobutenes, followed by the treatment with alcohols, to yield polymers containing the alkoxysilanic function, crosslinkable in the presence of ambient humidity.

Such preparation is anyway difficultly applicable on an industrial scale, due to the complexity and of the high costs thereof.

In U.S. Pat. No. 4,524,187, issued on June 18, 1985, a process is disclosed for preparing fluid silylated copolymers of isobutene, suitable for use in sealants, and crosslinkable under the influence of the ambient humidity. According to this process, particular copolymers of isobutene with 1,3,7-octatriene or with 5-methyl-1,3,6-heptatriene are grafted with chlorosilanes, such as, e.g., HSiMeCl$_2$ and HSiMe$_2$Cl. The alkoxysilanic functions necessary for the crosslinking are obtained by means of the subsequent treatment with alcohols. In this process, mild grafting conditions in the presence of platinum-based catalysts, or the like, are used. In U.S. Pat. No. 4,524,187 issued on June 18, 1985 the alkoxysilanic function is on the contrary directly grafted on copolymers of isobutene with 1,3,7-octatriene or 5-methyl-1,3,6-heptatriene, by means of the reaction with thiomercaptopropylalkoxysilanes in the presence of free-radical or anionic catalysts.

The processes disclosed in said U.S. Patent is burdensome and shows the drawback that the special copolymers of isobutene with 1,3,7-octatriene or 5-methyl-1,3,6-heptatriene must be produced according to a process wherein blends of (chlorinated/non-chlorinated) solvents are used, to secure the solubility of the catalyst, with this latter being furthermore used in large amounts, and that in the subsequent grafting reaction the solvent must be changed.

SUMMARY OF THE INVENTION

The present Applicant has found now that it is possible to overcome the drawbacks deriving from the present state of the art, by means of a process which makes it possible to obtain a silylated polyisobutene which crosslinks under ambient conditions of temperature and pressure, by means of the direct copolymerization of isobutene with a suitable comonomer containing the chlorosilanic function, and the subsequent conversion of the chlorosilanic bond into the alkoxysilanic bond by reaction with the corresponding alcohol.

A purpose of the present invention is therefore a process for the preparation of fluid silylated copolymers of isobutene, crosslinkable under ambient conditions of humidity and temperature, suitable for use in sealants and paints.

Another purpose of the present invention are said copolymers.

A further purpose of the present invention are formulations suitable for use in the field of sealants and of paints containing said copolymers.

DESCRIPTION OF THE INVENTION

In accordance with the above purposes, according to the present invention silylated copolymers of isobutene, crosslinkable under ambient conditions of humidity and temperature, which are suitable for use in sealants and paints, are prepared by means of a process according to which:

(a) isobutene is copolymerized with a silylated unsaturated comonomer defined by the formula:

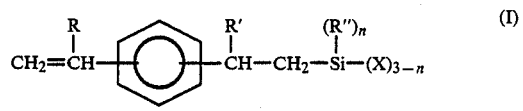

wherein:
R and R′=H, CH$_3$;
R″=an alkyl radical containing from 1 to 5 carbon atoms;
X=Cl, Br;
n=0, 1, 2;

and the substituents on the benzene rings are in ortho, or meta, or para position, by operating in solution, in inert organic solvents, at a temperature comprised within the range of from −100° C. to 0° C., in the presence of Lewis' acids catalysts, until copolymers with an $\overline{Mn}$ of from 2,000 to 50,000 are obtained, which contain percentages of from 0.1 to 10% by weight of the silylated comonomer;

(b) the so-obtained copolymer is treated with an aliphatic alcohol of from 1 to 5 carbon atoms, to yield an end polymer containing the alkoxysilanic function:

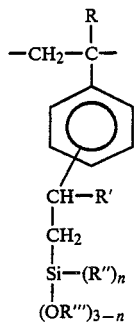

wherein:
R, R', R", n have the above seen meaning; and
R'''=an alkyl radical of from 1 to 5 carbon atoms;
(c) the copolymer is recovered from the reaction mixture.

According to the present invention, the unsaturated silylated comonomer (I) can be obtained by means of the hydrosilation of divinylbenzene (either pure, or as the commercial mixture of ethylvinylbenzene-divinylbenzene) or of dipropenylbenzene, with halosilanes of the type:

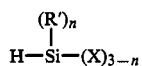

wherein R", X and n have the above seen meaning, in the presence of catalytic amounts of chloroplatinic acid.

The reaction is carried out at a temperature of from 40° to 80° C. and for a time of some hours under an atmosphere of an inert gas in an anhydrous environment.

The preferred silylating agent is HSiMeCl$_2$ (Me=CH$_3$), but also HSiCl$_3$, HSiMe$_2$Cl can be used. An advantage of the present invention is the fact that for the subsequent copolymerization with isobutene, the raw product coming from such a hydrosilation reaction can be used, without separating the pure comonomer (I) being necessary.

The copolymerization of isobutene with the unsaturated silylated comonomer (I) (either in pure form, or as the raw material outcoming from the hydrosilation reaction) is carried out in solution, in inert, anhydrous, organic solvents, in particular, aliphatic hydrocarbons, such as, e.g., pentane, hexane, isopentane, heptane, kerosene, either pure or mixed with one another.

As the copolymerization catalysts, Lewis' acids, are used, preferably AlCl$_3$, which is charged to the copolymerization reaction as a suspension in hydrocarbons of particles having an average dimension of from 0.5 to 2μ, at the concentration of from 0.1 to 2% by weight.

The reaction temperature is comprised within the range of from −100° C. to 0° C. and preferably of from −60° C. to 0° C., and the reaction is carried out under an atmosphere of inert gas, in an anhydrous environment.

By controlling the temperature within the above said range, it is possible to obtain copolymers having a desired molecular weight ($\overline{Mn}$ of from 2,000 to 50,000, and preferably of from 2,500 to 20,000).

For the purpose of regulating the molecular weight, chain transfer agents can be furthermore used, such as, e.g., tert.butyl chloride, allyl chloride and bromide, or, if one does not wish to use halogenated compounds, indene, cyclopentadiene, isooctene, and so forth, can be used.

The unsaturated silylated comonomer is extremely reactive and copolymerizes to a complete extent, within a time comprised within the range of from 5 to 30 minutes.

The amounts of comonomer regarded as optimum in the copolymer are comprised within the range of from 0.1 to 10% by weight, or, preferably, from 1 to 5% by weight.

To the polymeric solution contained inside the polymerization reactor, an aliphatic alcohol of from 1 to 5 carbon atoms is added, in an amount from 1.5 to 5 times as large as the amount required by the stoichiometry of alcoholysis of the Si—Cl and Al—Cl bonds, and an HCl-blocker is added, in a molar ratio of the HCl-blocker to the alcohol of from 3/1 to 4/1. This reaction occurs normally at a temperature comprised within the range of from room temperature (20°-25° C.) to approximately 40° C.

Practically, the alcohol is added to the polymeric solution coming from the polymerization step at the polymerization temperature, and temperature is permitted to increase up to the indicated values.

The preferred alcohol is methanol, due to its volatility, and the hydrogen chloride blocker is usually a low molecular weight epoxide, such as, e.g., propylene oxide or ethylene oxide, or an orthoformate, e.g., trimethyl orthoformate.

The conversion of the chlorosilanic groups into alkoxysilanic groups is quantitative, and at the end of the reaction, the AlCl$_3$ catalyst, which precipitates from the polymeric solution as Al(OR''')$_3$, can be removed by simple filtration or decantation.

The silylated copolymers obtained by means of the process of the present invention are characterized in that they contain at least one molecule, and preferably two molecules, of silylated comonomer, per each macromolecule, and have an $\overline{Mn}$ comprised within the range of from 2,000 to 50,000, and preferably of from 2,500 to 20,000, and can be used in the field of the sealants and of the paints, wherein a low permability to water, a considerably high resistance to oxidation and to the chemical agents, excellent electrical properties are required.

Such copolymers can be used as such, or to them diluents and/or plastifiers can be added, and they can be used in formulations containing crosslinking catalysts, siliceous materials, mineral fillers, dyeing agents, UV absorbers, and so forth.

The catalysts are generally constituted by salts and organic compounds of heavy metals, such as, e.g., dibutyltin dilaurate or titanium tetrabutoxide and/or by aliphatic amines, such as, e.g., laurylamine.

Among the siliceous materials, in particular amorphous silica can be used.

The advantages achieved with the preparation of said fluid silylated copolymers of isobutene according to the process disclosed in the present invention are numerous.

First of all, the preparation of the copolymer containing the chlorosilanic function can be carried out in one single step only, and the subsequent transformation of the chlorosilanic function into the alkoxysilanic function can be carried out inside the same reactor, and with the same solvent.

The efficacy, then of the alkoxysilanic function introduced is such that, for copolymers having an $\overline{Mn}$ comprised within the range of from 2,000 to 50,000, amounts of comonomer of from 0.1 to 2% by weight in the copolymer are enough to cause the same copolymer to crosslink due to the effect of the ambient humidity and at ambient temperature, with amount of end gel larger than 60% by weight, relatively to the weight of the crosslinked material.

The silylated copolymers obtained by the process disclosed in the present invention show, after the crosslinking, excellent mechanical properties, higher than of the polymers of the prior art, with the molecular weight and the crosslinking function being the same (ultimate tensile strength of from 3 to 10 kg/cm$^2$, elongation at break from 200 to 800%), combined with a considerable adhesion to many substrates such as, e.g., glass and concrete, without the aid of primers or of adhesion promoters.

Such copolymers are furthermore endowed with the excellent properties of chemical resistance and of barrier for gases, which is typical of isobutene polymers.

Because of the total absence of unsaturations, said copolymers are endowed with chemical-physical characteristics better than any other polymers which can be obtained by direct silylation, of the prior art.

DESCRIPTION OF THE PREFERRED EMBODIMENTS

The following examples are illustrative and not limitative of the same invention.

Example 1

To a reaction tube perfectly dry, and equipped with a side stopcock and screw cover, under a nitrogen atmosphere 18 g of commercial divinylbenzene (mixture of 45% by weight of ethyldivinylbenzene), 16.6 g of methyldichlorosilane and $4.10^{-5}$ mol of $H_2PtCl_6$ (as a 0.73M solution in isopropanol) are charged.

The reaction tube, perfectly sealed, is heated in an oil bath at 60° C. for 4 hours, with magnetic stirring. After the contents being cooled down to room temperature, they are stripped under vacuum, to remove unreacted chlorosilane. The obtained product is not furthermore purified, but is used as such in the copolymerizations with isobutene.

On the basis of the gas-chromatographic analysis, it is possible to determine that the product mixture is constituted by 86% of monosilylated products, with the balance to 100% being mainly constituted by unreacted ethylvinylbenzene.

Example 2

To a glass reactor of 400 ml of capacity, perfectly dry, equipped with mechanical stirrer, nitrogen inlet and low-temperature thermometer, 150 ml of anhydrous hexane is charged.

The reactor is then cooled to the temperature of −60° C. with a dry ice-ethanol bath.

To such reactor, 25 ml of anhydrous isobutene and 1 g of comonomer (I), prepared as in Example 1, are added.

The operations are all carried out under an inert atmosphere of nitrogen.

To the reaction mixture, cooled to the temperature of −50° C. and kept stirred, during a time of approximately 15 minutes 6 ml of an hexanic suspension of $AlCl_3$ at 1.5% by weight is added, while the temperature is controlled to remain within the range of from −55° C. to −45° C.

When the addition of the suspension of $AlCl_3$ is complete, the reaction mixture is maintained at −50° C. for a 30-minute time. To the polymerization reactor, 5 ml of a methanol/propylene oxide, in a molar ratio of 1/4 to each other, is then added.

At the end of the addition, the temperature is allowed to increase up to room values (20°-25° C.).

The catalyst, which has precipitated as $Al(OMe)_3$, is filtered off, and the solvent is eliminated by stripping under vacuum.

The polymer is obtained with a conversion yield of 90%.

The polymer shows the following characteristics:
viscosity at 50° C. ($\eta^{50}$): $10^4$ Pa.s;
number average molecular weight ($\overline{Mn}$): 10,000.

The polymer, after the addition to it of 1% of usual stabilizers, and of 1% of laurylamine and dibutyltin dilaurate as crosslinking catalysts, is used to spread a film of 2 mm of thickness, for the purpose of evaluating the parameters relating to the crosslinking under room conditions. The following results are obtained:
time to touch dry: 1-2 hours
Gel % after 10 days: 80%.

On the crosslinked material, after that constant values of gel % are reached, mechanical tests for tensile strength are carried out. The following results are obtained in accordance with ASTM D-412:
modulus at 100%: 2.92 kg/cm$^2$
ultimate tensile strength: 7.01 kg/cm$^2$
elongation at break: 430%
elastic recovery (after 5 minutes): 98%

Example 3

By following the same operating modalities as of Example 2, to the reactor 250 ml of anhydrous hexane, 20 g of anhydrous isobutene and 0.5 g of comonomer (I), prepared as in Example 1, are added.

For the polymerization, 8 ml is used of hexanic suspension of $AlCl_3$, and in the following reaction of alcoholysis, 5 ml of methanol/propylene oxide mixture in the mutual ratio of 1/4 is added.

The polymer is obtained with a conversion yield of 90%, and shows the following characteristics:
viscosity at 50° C. ($\eta^{50}$): $3.10^4$ Pa.s;
number average molecular weight ($\overline{Mn}$): 11,000.

The polymer, after the addition to it of 1% of usual stabilizers, and of 1% of laurylamine and dibutyltin dilaurate as the crosslinking catalyst, is spread as a film of 1.5 mm of thickness, and the following results are obtained:
time to touch dry: 1-2 hours
Gel % after 10 days: 75%.

On the crosslinked material, after that constant values of gel % were obtained, mechanical tests for tensile strength were carried out. The following results were obtained in accordance with ASTM D-412:
modulus at 100%: 0.89 kg/cm$^2$
ultimate tensile strength: 3.25 kg/cm$^2$
elongation at break: 650%

Example 4

By following the same operating modalities as of Example 2, to the reactor 250 ml of anhydrous hexane, 20 g of anhydrous isobutene and 2 g of comonomer (I), prepared as in Example 1, are added.

The polymerization is carried out at −30° C., making sure that during the addition of 4 ml of hexanic suspension of AlCl₃ the temperature remains within the range of from −35° to −25° C.

For the following reaction of alcoholysis, 10 ml of methanol/propylene oxide in the mutual ratio of 1/4 is used.

The polymer is obtained with a conversion yield of 85%, and shows the following characteristics:
viscosity at 50° C. ($\eta^{50}$): 450 Pa.s;
number average molecular weight ($\overline{Mn}$): 4,000.

The polymer is treated as in Example 3, and the characteristics of the film are:
time to touch dry: 36 hours
Gel % after 9 days: 70%.

The mechanical tests for tensile strength, carried out on the crosslinked material, after that constant values of gel % were obtained, gave the following results, in accordance with ASTM D-412:
modulus at 100%: 1.73 kg/cm²
ultimate tensile strength: 4.30 kg/cm²
elongation at break: 289%

Example 5

In this Example, the polymer was prepared by following the same modalities as reported in Example 3, both as relates the proportions of the reactants, and as relates to the temperature of polymerization. The so-obtained polymer was used for preparing a formulation having the following percent composition by weight:
polymer: 60.6%
plasticizer (Vistanex polybutenes): 15.1%
solvent (toluene, xylene): 15.1%
SiO₂: 7.5%
antioxidant: 0.8%
U.V. stabilizer: 0.8%

To the formulation, 0.5% of laurylamine and 1% of dibutyltin dilaurate were added, and the formulation was made crosslink in the air, as in the preceding Example. The following results were obtained:
time to touch dry: 1–2 hours
Gel % after 30 days: 54%.

The mechanical tests for tensile strength, carried out on the crosslinked material, after that constant values of gel % were obtained, gave the following results, in accordance with ASTM D-412:
modulus at 100%: 0.60 kg/cm²
ultimate tensile strength: 4.77 kg/cm²
elongation at break: 720%

We claim:

1. Process for the preparation of silylated copolymers of isobutene, crosslinkable under ambient conditions of humidity and temperature, suitable for use in sealants and paints, characterized in that:
(a) isobutene is copolymerized with a silylated unsaturated comonomer defined by the formula:

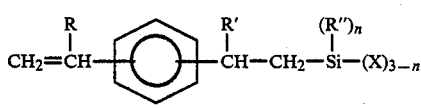  (I)

wherein:
R and R'=H, CH₃;
R''=an alkyl radical containing from 1 to 5 carbon atoms;
X=Cl, Br;
n=0, 1, 2;
and the substituents on the benzene rings are in ortho, or meta, or para position, by operating solution, in inert organic solvents, at a temperature comprised within the range of from −100° C. to 0° C., in the presence of Lewis' acids catalysts, until copolymers with an $\overline{Mn}$ of from 2,000 to 50,000 are obtained, which contain percentages of from 0.1 to 10% by weight of the silylated comonomer;
(b) the so-obtained copolymer is treated with an aliphatic alcohol of from 1 to 5 carbon atoms, to yield an end polymer containing the alkoxysilanic function:

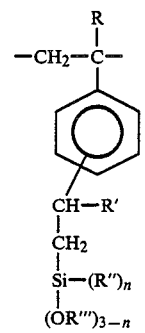

wherein:
R, R', R'', n have the above seen meaning; and
R'''=an alkyl radical of from 1 to 5 carbon atoms;
(c) the copolymer is recovered from the reaction mixture.

2. Process according to claim 1, characterized in that the inert organic solvent of the step (a) is an aliphatic hydrocarbon.

3. Process according to claim 2, characterized in that the solvent is selected from pentane, hexane, isopentane, heptane, kerosene.

4. Process according to claim 1, characterized in that the temperature is comprised within the range of from −60° C. to 0° C.

5. Process according to claim 1, characterized in that the catalyst in the step (a) is AlCl₃.

6. Process according to claim 5, characterized in that AlCl₃ is charged to the copolymerization reactor in the form of a suspension in hydrocarbons, at the concentration of from 0.1 to 2% by weight.

7. Process according to claim 1, characterized in that copolymers are obtained, which have an $\overline{Mn}$ comprised within the range of from 2,500 to 20,000.

8. Process according to claim 1, characterized in that the percentage of the silylated comonomer in the step (a) ranges from 1 to 5% by weight.

9. Process according to claim 1, characterized in that the alcohol is added in an amount from 1.5 to 5 times as large as the amount required by the stoichiometry of alcoholysis of Si—Cl and Al—Cl bonds.

10. Process according to claim 9, characterized in that the alcohol is added in mixture with a blocker for hydrogen chloride, in a hydrogen chloride blocker/alcohol molar ratio comprised within the range of from 3/1 to 4/1.

11. Process according to claim 10, characterized in that the alcohol is methanol, and that the hydrogen chloride blocker is an epoxide, or is trimethyl orthoformate.

12. Process according to claim 11, characterized in that the epoxide is propylene oxide or ethylene oxide, and that the process is carried out at a temperature comprised within the range of from room temperature (20°–25° C.) to 40° C.

* * * * *